United States Patent [19]

Schlanzky et al.

[11] 3,798,970

[45] Mar. 26, 1974

[54] FUEL LEVEL SENDER FOR A VEHICLE FUEL TANK

[75] Inventors: Manfred P. H. Schlanzky, Frankenmuth; John E. Creager, Fenton, both of Mich.

[73] Assignee: General Motors Corporation, Detroit, Mich.

[22] Filed: Feb. 16, 1973

[21] Appl. No.: 333,000

[52] U.S. Cl. ............................... 73/313, 338/33
[51] Int. Cl. ............................................ G01f 23/10
[58] Field of Search ......... 73/313, 317; 338/33, 293

[56] References Cited
UNITED STATES PATENTS
2,266,298  12/1941  Bacon ................................. 338/33
3,482,200  12/1969  Hamilton ......................... 73/313 X
3,433,073  3/1969   Kunert ................................ 73/313

Primary Examiner—Richard C. Queisser
Assistant Examiner—Daniel M. Yasich
Attorney, Agent, or Firm—Howard N. Conkey

[57] ABSTRACT

A fuel level sender for a vehicle fuel tank in which two etched resistors are carried on respective planar surfaces of two bases. The bases are attached so that the resistors are spaced apart. Each resistor is comprised of a plurality of continuous running parallel loops terminating at a common bus bar on one end and terminating at respective output terminals on the other end. The effective length of each of the loops of one resistor are shortened so that the resistance between the output terminals equals a predetermined value. A wiper arm has two electrically coupled contacts engaging the resistors respectively and which are moved arcuately across the loops of the resistors in accordance with fuel level to vary the resistance between the output terminals as a measure of the fuel level.

2 Claims, 5 Drawing Figures

FUEL LEVEL SENDER FOR A VEHICLE FUEL TANK

This invention relates to a fuel level sender. More specifically, this invention relates to a fuel level sender characterized by its improved accuracy and durability.

Fuel level senders are known which present a resistance at a pair of output terminals which is representative of the level of fuel in a fuel tank. In this form of sender, a potentiometer wiper arm is rotated by a float to an angular position indicative of fuel level. It is this form of fuel level sender to which this invention is directed.

The general object of this invention is to provide a fuel level sender having improved accuracy and durability.

It is another object of this invention to provide a fuel level sender whose total impedance is readily adjustable to provide for sender calibration to improve the accuracy thereof.

It is another object of this invention to provide for a fuel level sender including a pair of etched resistors carried by respective bases such that the resistors are spaced apart with the bases providing a protective shell therefor and a wiper arm carried by the bases between the pair of etched resistors to vary the resistance at a pair of output terminals in accordance with liquid level.

These and other objects of this invention are accomplished by a pair of etched resistors carried on respective planar surfaces of two bases. The bases are attached together so that the resistors are spaced apart with the bases providing a protective shell for the etched resistors. Each of the resistors is comprised of a plurality of continuous running parallel loops terminating at a common bus bar on one end and terminating at respective output terminals on the other end. A wiper arm has two electrically coupled contacts engaging the resistors respectively. The contacts are moved arcuately across the loops of the resistor in accordance with fuel level to vary the resistance between the output terminals as a measure of the fuel level. One of the resistors is initially formed with loops having a length such that the resistance between the two output terminals is greater than the desired resistance so as to permit calibration by shortening the effective loop length until the desired resistance is obtained.

The objects of this invention may be best understood by reference to the following description of a preferred embodiment and the drawings in which.

Figure 1:
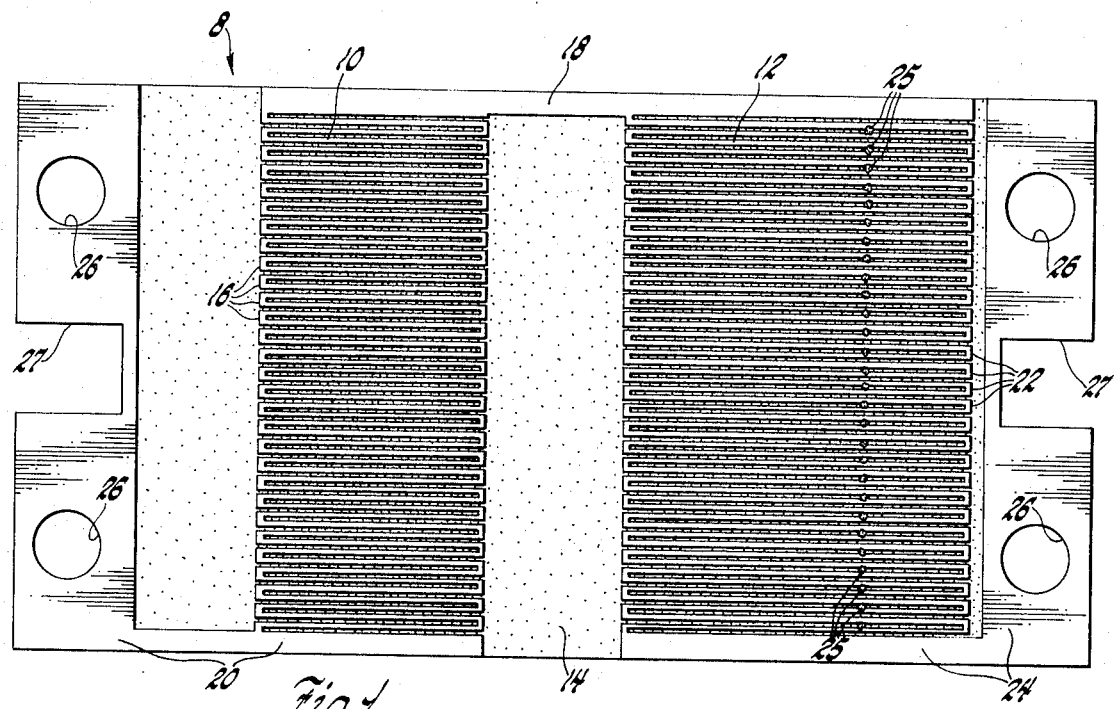
FIG. 1 is a drawing of the pair of etched resistors used in the fuel level sender of this invention.

Referring to FIG. 1, the fuel level sender of this invention includes an etched resistor assembly 8 comprised of a resistor 10 and a resistor 12 which are etched in a conventional manner on a flexible plastic film 14. The resistor 10 is comprised of a plurality of equal length, parallel running continuous loops 16 of resistive material which may be, for example, a nickel-copper alloy. One end of the resistor 10 terminates at an electrically conductive bus bar 18 and has another end terminating at an etched output terminal 20, the bus bar 18 and the output terminal being etched on the plastic film 14. The resistance between the output terminal 20 and the bus bar 18 is directly proportional to the total length of the loops 16. The resistor 12 is comprised of a plurality of equal length, parallel running continuous loops 22 of the resistive material and has one end terminating at the bus bar 18 and another end terminating at an etched output terminal 24, which is also etched on the plastic film 14. The resistance between the output terminal 24 and the bus bar 18 is directly proportional to the total effective length of the loops 22, effective length being defined as that portion of the resistor 12 which presents a resistance between the output terminal 24 and the bus bar 18. The maximum resistance between the output terminals 20 and 24 is equal to the sum of the resistance between the output terminal 20 and the bus bar 18 and the output terminal 24 and the bus bar 18. The actual length of the loops 22 are made greater than the length of the loops 16 for the purpose of fuel level sender calibration as will hereinafter be described.

The large tolerance inherent in the resistance of low cost resistors, including resistors made for use in variable resistance fuel level senders is detrimental to their accuracy. To provide for a precise maximum resistance between the output terminals and thereby provide for improved accuracy, the actual length of the loops 22 of the resistor 12 are such that the resistance between the output terminals 20 and 24 is greater than desired. The desired resistance is then obtained by positioning a conductive element 25, such as solder, on each loop 22 end portions so as to short out the end portions to decrease the effective length thereof by equal amounts until the precise desired resistance between the output terminals 20 and 24 is obtained.

Each of the output terminals 20 and 24 include a pair of mounting holes 26 and a pair of cut-out portions 27 intermediate the ends of the respective resistors 10 and 12.

Figure 2:
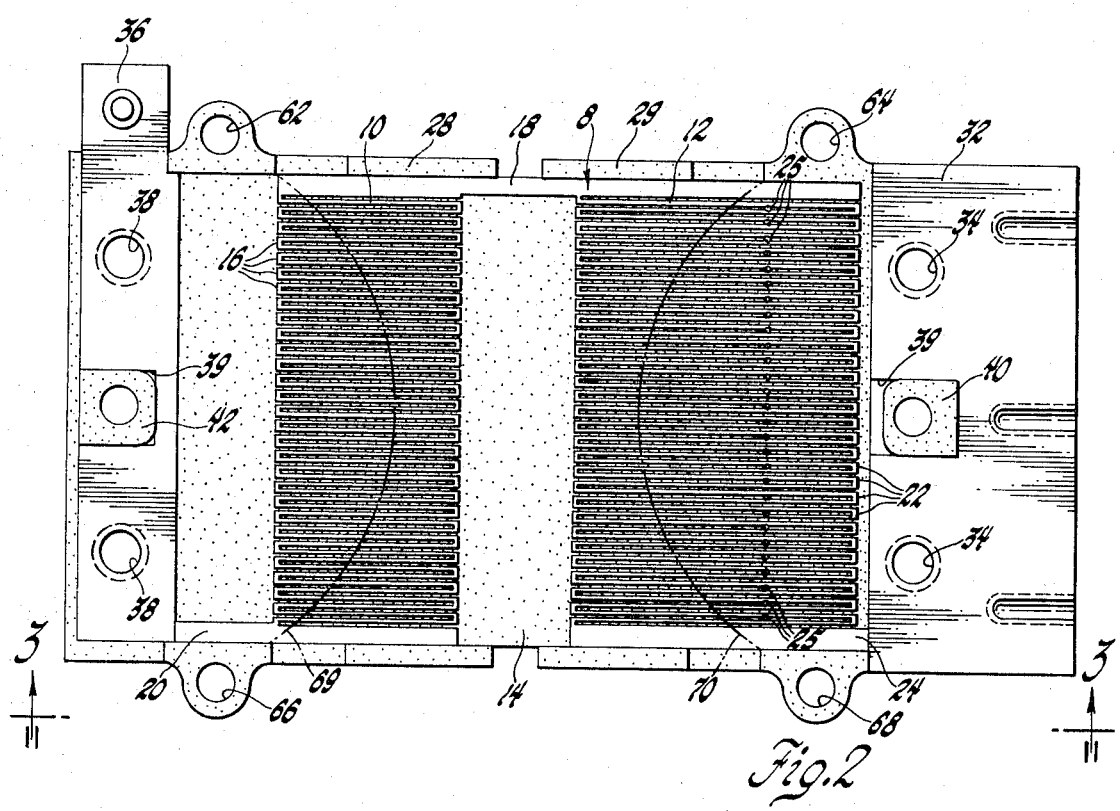
FIG. 2 is a drawing illustrating the mounting of the etched resistors of FIG. 1 on a pair of bases.

Referring to FIGS. 1 and 2, the etched resistor assembly 8 is positioned on a pair of identical plastic bases 28 and 29 with the resistor 10 lying on a planar surface of the base 28 and the resistor 12 lying on a planar surface of the base 29 such that the mounting holes 26 in the output terminals 20 and 24 are aligned with corresponding holes 30 (FIGS. 3 and 4) in the bases 28 and 29.

Figure 3:
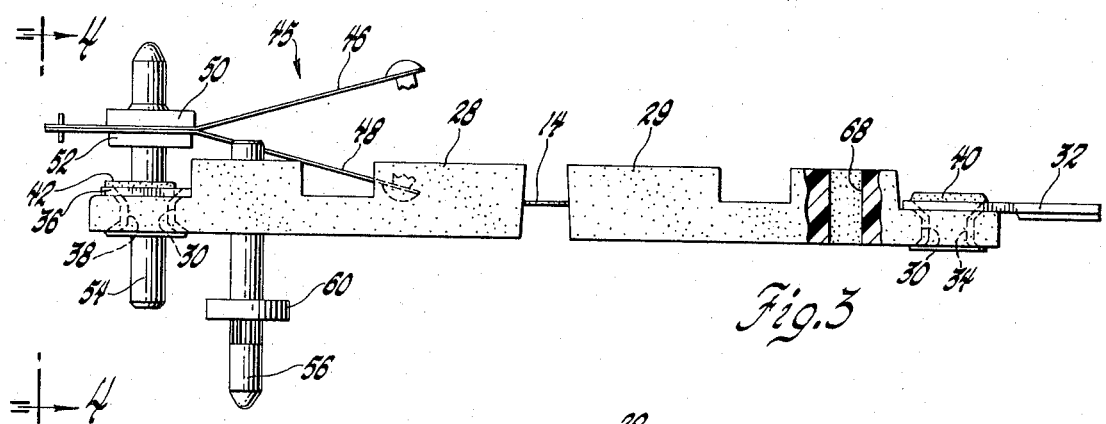
FIG. 3 is a drawing of the resistor and base assembly of FIG. 2 as viewed along line 3—3 of FIG. 2 with the addition of a wiper arm assembly.

A ground bracket 32 having a pair of extrusions 34 is positioned over the output terminal 24 with the pair of extrusions 34 projecting through the mounting holes 26 in the output terminal 24 and the holes 30 in the base 29. The ground bracket 32 engages the output terminal 24 and therefore effectively becomes a portion thereof. In like manner, a gauge bracket 36 having a pair of extrusions 38 is positioned over the output terminal 20 with the pair of extrusions 38 projecting through the mounting holes 30 in the output terminal 20 and the holes 30 in the base 28. The gauge bracket 36 engages the output terminal 20 and therefore effectively becomes a portion thereof. As seen in FIGS. 3 and 4, the extrusions 34 are flared out so as to secure the ground bracket 32 and the resistor 12 in place on the base 29 and the extrusions 38 are flared out so as to secure the gauge bracket 36 and the resistor 10 in place on the base 28. Each of the ground and gauge brackets 32 and 36 has a cut-out portion 39 aligned with the cut-out portion 27 of the output terminals 24 and 20, respectively. A protrusion 40 of the base 29 extends through the cut-out portions 27 and 39 of the output terminal 24 and the ground bracket 32, respectively, and a protrusion 42 of the base 28 extends through the cut-out portions 27 and 39 of the output terminal 20 and gauge bracket 36, respectively. Each of the protrusions 40 and 42 has a hole therein which defines a pivot point intermediate the ends of the resistors 10 and 12 for a wiper arm assembly as will hereinafter be described.

Figure 4:
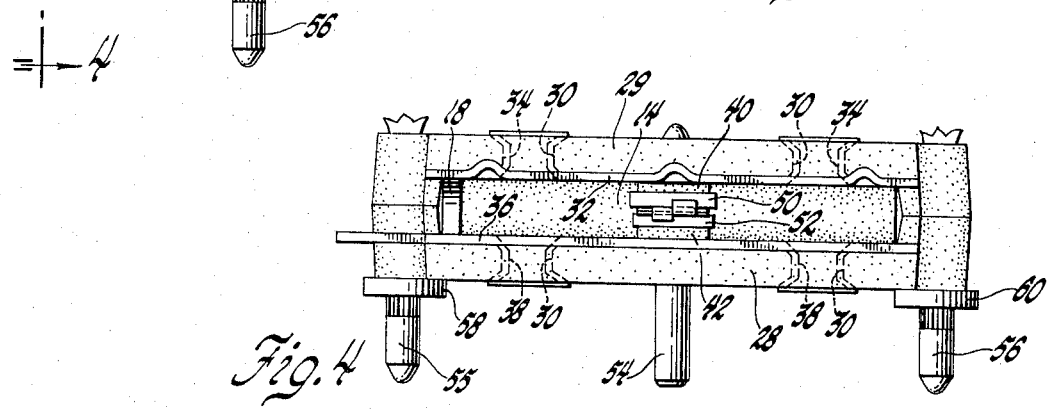
FIG. 4 is a drawing of the folded and assembled fuel level sender as viewed along line 4—4 of FIG. 3.

Referring to FIGS. 3 and 4, a wiper arm assembly 45 includes a pair of identical electrically conductive contact members 46 and 48 positioned between a pair of washers 50 and 52 over a knurled portion of a shaft 54 for rotation therewith. The shaft 54 is positioned through the hole in the protrusion 42 of the base 28 so that the wiper arm 48 engages the resistor 10. The wiper arms 46 and 48 are keyed so as to establish their relative positions.

The base 29 is folded over as shown in FIG. 4 so that the shaft 54 extends through the hole in the protrusion 40 on the base 29 with the wiper arm assembly 45 and the resistors 10 and 12 being positioned between the bases 28 and 29, the contact member 48 engaging the resistor 10 and the contact member 46 engaging the resistor 12. By this construction the fuel level sender is self-protecting in that the bases 28 and 29 provide a protective shell for the resistors 10 and 12 and the wiper arm assembly 45 to accomplish one of the principal features of this invention. In the folded over position, the protrusions 40 and 42 emgage the washers 50 and 52, respectively. As the bases 28 and 29 are made from a plastic or other insulating material, the protrusions 40 and 42 therefore electrically insulate the contact members 46 and 48 from the gauge bracket 36 and the ground bracket 32. The bases 28 and 29 are maintained in this position by a pair of stop pins 55 and 56, each having a respective flange 58 and 60, the pin 55 being positioned through a pair of aligned openings 62 and 64 (FIG. 2) in the bases 28 and 29, respectively, with the flange 58 engaging the base 28 and the pin 56 being positioned through a pair of aligned openings 66 and 68 (FIG. 2) in the bases 28 and 29, respectively, with the flange 60 engaging the base 29. Each of the stop pins 55 and 56 are staked at the top of the pins so as to secure the bases 28 and 29 in the assembled position shown in FIG. 4. In this position, it can be seen that the resistors 10 and 12 are spaced apart with the contact member 46 engaging the resistor 12 and the contact member 48 engaging the resistor 10. As the shaft 54 is rotated, the contact members 46 and 48 are arcuately moved across the loops 22 and 16, respectively, of the resistors 12 and 10 as indicated by the dotted lines 69 and 70 of FIG. 2.

As the contact members 46 and 48 are electrically coupled, they operate to short circuit a portion of the resistors 10 and 12 in accordance with the angular position of the shaft 54. For example, when the shaft is in a position so that the contact members 48 and 46 engage the output terminals 20 and 24, respectively, the resistance presented between the output terminals 20 and 24, and consequently the gauge bracket 36 and the ground bracket 32, is zero. As the shaft is rotated, the contact members 46 and 48 are moved arcuately across the loops 16 and 22 with the resistance between the output terminals 20 and 24 increasing to a value which is a function of the angular position of the shaft 54 and the contact members 46 and 48. When the shaft 54 is rotated such the contact members 46 and 48 are positioned to engage the bus bar 18, the resistance between the output terminals 20 and 24 is at a maximum and equals the predetermined desired value previously described.

Figure 5:
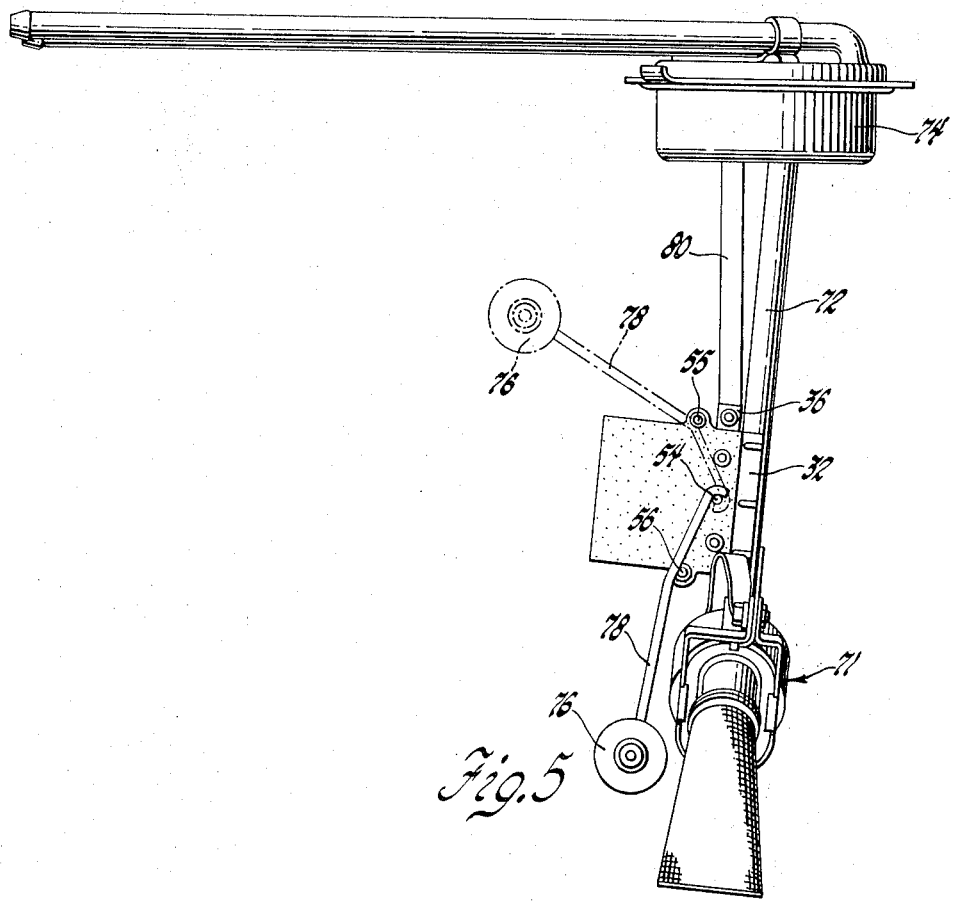
FIG. 5 is a schematic drawing of the fuel level sender of FIG. 4 mounted on a vehicle fuel tank cover - fuel pump assembly.

Referring to FIG. 5, there is shown a fuel pump assembly 71 for pumping fuel from a vehicle fuel tank (not shown) through a suction tube 72 and through the fuel tank cover 74. The fuel level sender is secured in the fuel tank by welding the ground bracket 32 to the suction tube 72, which, when the pump assembly 71 is mounted in the fuel tank, is at electrical ground. A float 76 is carried on one end of a float arm 78 which is attached by its remaining end to the shaft 54 so as to rotate the shaft and the attached contact members 46 and 48 to an angular position as determined by the level of fuel in the fuel tank. The movement of the float 76 and the arm 78 is limited by the stop pins 55 and 56 which extend beyond the base 28 to limit the movement of the contact members 46 and 48 between the output terminals 20 and 24 and the bus bar 18. A conductor 80 is connected to the gauge bracket 36 and a gauge circuit (not shown) which is responsive to the resistance between the output terminals 20 and 24 to indicate the level of fuel in the fuel tank.

Although in the preferred embodiment, each of the loops 22 of the resistor 12 were shortened by an equal amount during calibration to achieve the desired resistance, the loops 22 could be shortened by different lengths to compensate for irregularties in the shape of a tank to provide for an accurate gauge readout as a function of fuel level. Also, each of the resistors 10 and 12 could be etched on separate plastic films or other insulating material versus a single plastic film.

The description of a preferred embodiment of this invention for the purpose of explaining the principles thereof is not to be considered as limiting or restricting the invention, since many modifications may be made by the exercise of skill in the art without departing from the scope of the invention.

What is claimed is:

1. A fuel level sender for a vehicle fuel tank comprising: first and second bases, wach of said bases having a planar surface; means for coupling the first and second bases in an aligned position one above the other so that the respective planar surfaces are spaced apart; first and second opposed electrical output terminals insulatively carried by the first and second bases respectively; a first resistor secured to the planar surface of the first base, the first resistor being comprised of a plurality of parallel running continuous loops and having a first end connected to the first output terminal and a second end; a second resistor secured to the planar surface of the second base, the second resistor being comprised of a plurality of parallel running continuous loops and having a first end connected to the second output terminal and a second end; an electrically conductive bus bar connected between the second ends of the first and second resistors; a shaft rotatably disposed in the first and second bases at least one wiper arm means carried by the shaft between the first and second bases, the wiper arm means including first and second electrically coupled contact members engaging the first and second resistors respectively, the first and second contact members being arcuately moved across the respective loops of the first and second resistors to vary the resistance between the first and second output terminals as a function of the angular position of the shaft; and float means coupled to the shaft and responsive to the level of fuel in the fuel tank for rotating the shaft to an angular position corresponding to said level, whereby the resistance between the first and second output terminals is representative of the level of fuel in the vehicle fuel tank.

2. A fuel level sender for a vehicle fuel tank comprising: first and second bases, each of said bases having a planar surface; means for coupling the first and second bases one above the other so that the respective planar surfaces are spaced apart; first and second opposed electrical output terminals insulatively carried by the first and second bases respectively; a first resistor secured to the planar surface of the first base, the first resistor being comprised of a plurality of parallel running continuous loops and having a first end connected to the first output terminal and a second end, each of the loops of the first resistor having a specified length; a second resistor secured to the planar surface of the second base, the second resistor being comprised of a plurality of parallel running continuous loops and having a first end connected to the second output terminal and a second end, each of the loops of the second resistor having a length greater than the specified length; an electrically conductive bus bar connected between the second ends of the first and second resistors; means for shorting a portion of each of the loops of the second resistor so that the maximum resistance between the first and second terminals equals a specified magnitude; a shaft rotatably disposed in the first and second bases at least one wiper arm means carried by the shaft between the first and second bases, the wiper arm means including first and second electrically coupled contact members engaging the first and second resistors respectively, the first and second contact members being arcuately moved across the respective loops of the first and second resistors to vary the resistance between the first and second output terminals as a function of the angular position of the shaft; and float means coupled to the shaft and responsive to the level of fuel in the fuel tank for rotating the shaft to an angular position corresponding to said level, whereby the resistance between the first and second output terminals is representative of the level of fuel in the vehicle fuel tank.

* * * * *